No. 827,167. PATENTED JULY 31, 1906.
R. MASON.
COMBINATION TOOL.
APPLICATION FILED MAR. 9, 1906.
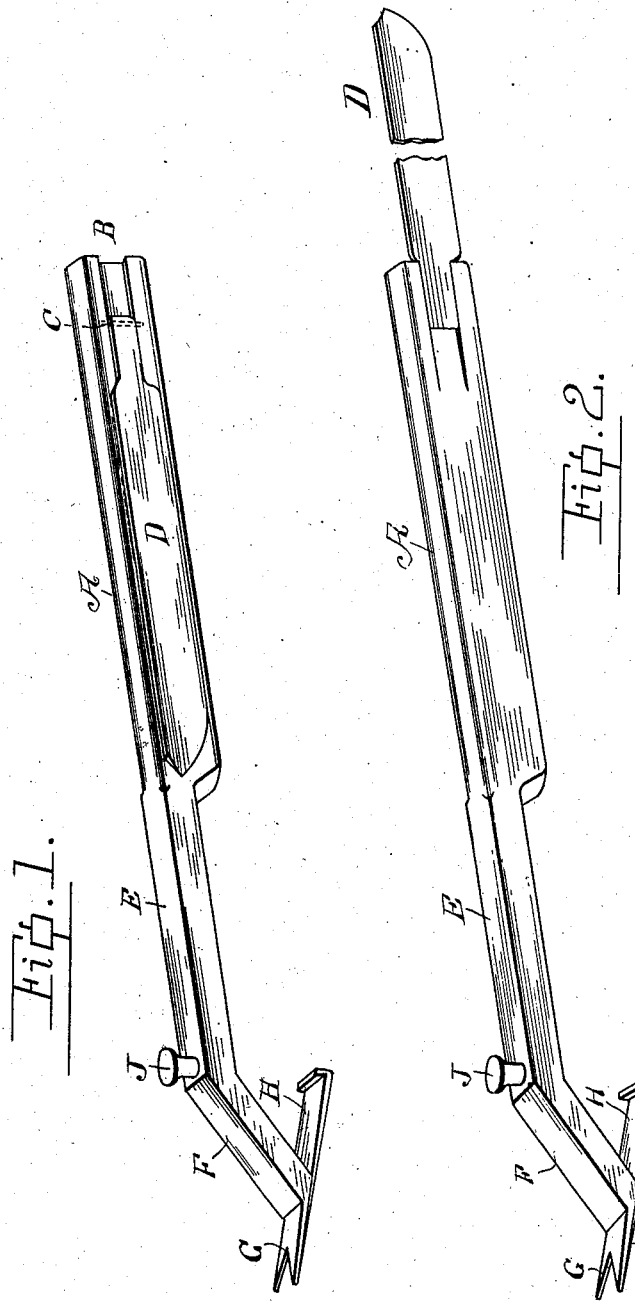

UNITED STATES PATENT OFFICE.

RICHARD MASON, OF CUMBERLAND, MARYLAND.

COMBINATION-TOOL.

No. 827,167. Specification of Letters Patent. Patented July 31, 1906.

Application filed March 9, 1905. Serial No. 249,246.

*To all whom it may concern:*

Be it known that I, RICHARD MASON, a citizen of the United States, residing at Cumberland, in the county of Allegany and State of Maryland, have invented certain new and useful Improvements in Combination-Tools, of which the following is a specification.

My invention relates to improvements in combination-tools; and the main object of my invention is the provision of a combination-tool which in a single implement will embody a tack-puller, tack-hammer, and knife each capable of performing its separate and particular function in a thorough and practical manner and the implement as a whole being so simple as to be rendered very inexpensive of production.

To attain the desired object, the invention consists of a combination - tool embodying novel features of construction, combination, and arrangement of the several implements for service, substantially as disclosed herein.

Figure 1 represents a perspective view of the complete implement or tool, the knife being shown in closed position; and Fig. 2 represents a similar view, the knife-blade being shown as open.

My tool is of extremely simple and inexpensive construction and comprises the handle A, one end of which is provided with a kerf or recess B, forming the shoulder or abutment to which, at C, is hinged the knife-blade D, and the other end of the handle is formed with a shank or stem E, provided with the inclined end F, which is provided with a claw G for pulling the tack, with a spring resting portion H, and on the upper side is formed with a head J to serve as a tack driver or hammer.

I claim—

The combination - tool herein described, consisting of the handle, the stem or shank extending from the inner end of the handle, the head on the shank, the downward-extending end portion formed on the shank or stem, the upwardly-inclined claw formed on said end portion and extending forward and the downwardly-inclined spring resting portion formed on said end portion in line with the claw and extending rearward said resting portion having a flanged end.

In testimony whereof I affix my signature in presence of two witnesses.

RICHARD MASON.

Witnesses:
RALPH WILLARD,
C. S. OFFUTT.